United States Patent Office 2,774,710
Patented Dec. 18, 1956

2,774,710

PHARMACEUTICAL PREPARATION FOR THE TREATMENT OF HYPERACIDITY

Kenneth Wade Thompson, Montclair, and Anthony Matthew Corrente, East Orange, N. J., assignors to Organon Inc., Orange, N. J., a corporation of New Jersey No Drawing. Application December 1, 1953, Serial No. 395,619

Claims priority, application Netherlands December 15, 1952

5 Claims. (Cl. 167—55)

The present invention relates to a pharmaceutical preparation and more particularly to an antacid preparation, said preparation being especially adapted for the treatment of disorders of the digestive tract caused by hyperacidity, and of other afflictions whereby decreasing gastric acid secretion is required.

The terms "antacid preparation" and "preparation for the treatment of hyperacidity" as used herein and in the claims annexed hereto designate a pharmaceutical preparation which suppresses the harmful action of gastric acid on the mucous gastric and/or duodenal lining. Different types of antacids are generally known, namely antacids which cause neutralization of the gastric acid by chemical reaction, for instance, by neutralization, such as sodium bicarbonate, tricalcium phosphate, trimagnesium phosphate, magnesium oxide, magnesium hydroxide, calcium carbonate, magnesium carbonate, aluminum hydroxide, aluminum phosphate, dihydroxy aluminum amino acetate, calcium silicate, magnesium trisilicate, bismuth salts, calcium citrate, anion exchange resins, and others, and antacids which suppress gastric secretion and motility by their anticholinergic action, such as stropine, dibutoline, i. e., dibutyl carbamate of choline chloride, banthine, i. e., β-diethyl amino ethyl xanthene-O-carboxylate methobromide, and others. Neutralizing agents are often employed in combination with agents which provide the gastric and duodenal mucosa with a protective colloidal film. Such agents are, for instance, proteins such as gastric mucin, alkali alginates, pectins, and others. Some of the neutralizing agents, such as aluminum hydroxide and magnesium trisilicate form colloidal gels on contact with water which gels combine the ability to neutralize hydrochloric acid with the ability to form a protective layer.

However, said last mentioned antacid agents and the combinations of neutralizing antacid agents with protective layer-forming agents have the great disadvantage that their ability of forming such layers is considerably impaired by low pH-values as their viscosity is considerably reduced at higher acidity. As a result of such a reduced viscosity, their power of adhering to the muscous lining of the stomach and duodenum is considerably reduced so that they do not properly adhere thereto and do not properly protect such mucosa.

A known disadvantage of neutralizing antacids is that, after neutralization to a pH greater than 5.5, increased secretion of gastric acid, so-called acid rebound secretion, will set in, as a result whereof an acid concentration is produced in the stomach which may even exceed the acid concentration present before administration of the antacid preparation.

It is one object of the present invention to provide an antacid preparation which combines the antacid effects of the known antacids with the property of forming a protective layer of excellent adhesiveness to the gastric and duodenal mucosa whereby the viscosity and adhesiveness of said layer are not impaired by increasing acidity of the stomach and which does not give rise to acid rebound secretion. The new and improved antacid preparation according to the present invention, therefore, represents an ideal antacid of highest efficiency and far surpasses the known antacid preparations in its beneficial effects.

Other objects of this invention and advantageous features thereof will become apparent as the description proceeds.

In principle, the present invention consists in providing an antacid preparation comprising a known material of antacid activity, the outstanding agents having been heretofore set forth as they are conventionally used in antacid preparations, in intimate mixture with a specific vegetable gum, namely guar gum.

Guar gum, also called guar flour, is made by grinding the refined endosperm of the guar seed of *Cyamopsis tetragonoloba* and other plants known as "guar" which are cultivated in Pakistan and India and for a number of years in the southwestern part of the United States. With water, it forms a mucilage the viscosity of which is not substantially altered by reducing the pH-value, i. e., with increasing acidity. Guar gum is a white to cream-colored, more or less granular powder. It is a polysaccharide mainly composed of galactose and mannose, i. e., it consists chiefly of galactomannane. It is a hydrophilic natural gum which swells and disperses in water and which absorbs water.

In antacid preparations according to the present invention guar gum is used in a purified grade compatible with the human organism. The powder disperses very readily in water at practically any pH-value. The dispersion forms a thixotropic gel if allowed to stand, without stirring, for a longer period of time. Said dispersion, even at a pH between about 1.5 and about 2.0, is highly viscous and retains its viscosity for a considerable period of time.

Excellent antacid preparations according to the present invention are obtained when using as antacid agents mixtures of calcium carbonate, magnesium carbonate, magnesium trisilicate, dried aluminum hydroxide gel and the like. Addition of guar gum in amounts of 20% to about 25% of the antacid agent or agents has proved to be especially advantageous although higher amounts, for instance, 50% and more, or lower amounts, for instance, 10% and even less can also be used. With amounts of about 20% to about 25% the further advantage is achieved that tablets made from such an antacid composition according to the present invention very readily disintegrate. Disintegration should not require more than 10 minutes and should be between about 1 minute and about 7 minutes in order to produce best results. The amount of guar gum may, of course, vary in accordance with the antacid agent or agents employed. The optimum composition for each antacid agent or mixture of antacid agents can readily be determined by testing experimental batches with varying guar gum content for their disintegrating power and their antacid activity.

Antacid preparations containing guar gum as carrier for the antacid agent are preferably supplied to the physician and the patient in the form of tablets, pills and the like in more or less compressed form. Of course, they can also be administered in the form of powders, preferably enclosed in a suitable capsule which is readily disintegrated by the acid stomach contents. They may also be employed in the form of aqueous dispersions whereby, if desired, other therapeutically effective ingredients may be added and dissolved, dispersed, or emulsified therein.

The preferred form of administration is the tablet form which can readily be administered. Such tablets disintegrate rapidly as soon as they come into contact with water and form thereby a highly viscous mass which has embedded and finely dispersed therein the antacid agent. Usually it is sufficient to mix the antacid agent with guar gum and to compress the mixture to tablets or other suitable shaped configuration. However, it has been found to be of advantage to add binding agents to the mixture. Oat flour has proved to be an especially suitable binding agent which has the further advantage that it improves the taste of the tablets and assists granulation of the mass to be tableted and retards the release of the antacid ingredients. Other conventionally used binding agents, such as vegetable proteins, starch, methyl cellulose, carboxy ethyl cellulose, milk sugar, and lubricating agents, such as stearic acid, talc, cocoa butter, magnesium stearate, may, of course, also be employed. Manufacture of tablets and other shaped preparations of new antacid compositions according to the present invention is carried out in the manner conventionally used in the art.

Tablets and similar compressed antacid preparations according to this invention are preferably composed in such a manner that they rapidly disintegrate within about 1 to 10 minutes, depending on the composition of the preparation, on coming into contact with water. Thereby the antacid agent is released but its individual particles are embedded and enveloped by the highly viscous dispersion formed from guar gum and water. As a result thereof the neutralizing and/or antacid action of the antacid agent is considerably prolonged. Guar gum, on contact with water, swells to 10 to 15 times its volume and, thus, has the further advantageous effect that it spreads over the entire surface of the stomach walls, thereby distributing the antacid agent evenly thereover so that said agent is able to neutralize hydrochloric acid near its point of formation, and protecting the gastric and duodenal mucosa. Such guar gum dispersions, as stated above, do not appreciably change their viscosity with changing pH-value and, therefore, are capable of exerting their protecting action not only under neutral conditions at a pH of about 7.0 but also under strongly acidic conditions at a pH of about 1.0 to 3.0. None of the other mucilaginous materials which, heretofore, have been added to antacid preparations, form a viscous gel which retains its viscosity at such highly acid pH-values. Therefore, they did not afford proper protection of the gastric and intestinal mucosa under conditions ordinarily prevalent in hyperacidity.

Said guar gum layer covering the mucosa and having embedded therein the antacid agent, releases said agent rather slowly and gradually, and, therefore, produces a considerably prolonged effect of said agent. The guar gum layer itself has a soothing effect upon the mucosa which considerably alleviates conditions of hyperacidity with their irritating effects upon the mucosa.

Tablets and other compressed preparations of the new antacid composition are preferably made by first granulating one or all the antacid agents with a binding agent. The granulate is then mixed with guar gum, preferably in the powdered state, and with other ingredients as they are conventionally used in tableting, such as fillers, lubricants, taste corrigents, and the like. The resulting mixture is finally tableted or compressed to any other desired configuration.

The following example serves to illustrate the present invention without, however, limiting the same thereto.

Example 2.7 g. of oatmeal are added, while stirring vigorously, to a solution of 6.0 g. of glucose in 21.0 cc. of distilled water. Stirring is continued until the mixture has attained a thick, sticky consistency.

Said mass is added to a powder mixture of 9.0 g. of magnesium trisilicate, 6.3 g. of calcium carbonate, 5.4 g. of aluminum hydroxide, and 3.6 g. of magnesium carbonate.

The mixture is stirred until it is moistened throughout the entire mass and starts to form granules. Said moist granules are spread out on plates and are dried at 60° C. The resulting granules are thoroughly mixed in a suitable mixing device with 6.0 g. of guar gum, 0.899 g. of talc, 0.444 g. of lemon essence, 1.482 g. of starch, and 0.270 g. of sodium cyclamate.

The mixture is sieved through a stainless steel sieve and compressed to tablets of about 0.7 g. each. 1 tablet given as an antacid in acute cases of hyperacidity, such as pyrosis, will generally be sufficient. When using the preparation as antacid agent in peptic ulcer, 4 of such tablets are given every two hours or in accordance with the physician's diagnosis and prescription.

In a similar manner there can be produced other preparations according to the present invention containing, besides guar gum, other antacid agents as enumerated hereinbefore. Since the methods of converting mixtures of active ingredients into tablet, etc., form are well known to the art, it is, of course, understood that the present invention is not limited to the precise mode of manufacture nor to the precise composition described hereinbefore in the example. The invention, as defined in the appended claims, can be embodied in a plurality and variety of forms and can be practiced in a plurality and variety of ways as is evident to a person skilled in the art.

In order to evaluate antacid preparations according to the present invention and to compare such preparations with known preparations, a convenient evaluation method is used and is presented hereinafter. Said method provides a measure of the antacid "capacity" of a preparation in terms of hydrochloric acid units and also in terms of pH-values. By plotting the data in a standard way, the different characteristics of various antacid preparations may be demonstrated graphically. The method allows appraising the speed of neutralization and the pattern of pH-fluctuations with additions of increments of acid as well as the buffering capacity. This new method of determining the antacid "capacity" of an antacid preparation is carried out as follows:

100 cc. of distilled water are placed in a 400 cc. glass beaker which is held in a constant temperature bath. The temperature is adjusted to the desired temperature, usually to 37° C. The water is continuously stirred with a mechanical stirring device whereby the rate of movement of the liquid is adjusted so that particles of the antacid added are only gently moved about. To effect pH-readings, the external glass electrodes of a Beckmann pH meter are clamped so that the terminals are below the surface of the liquid. A measured quantity of the antacid preparation, either as a powder or as a tablet or other compressed article or as a suspension or emulsion or the like is added to the continuously stirred liquid in the beaker. 10 minutes after addition of the antacid preparation to be tested, the pH of the mixture is determined and recorded.

During the next 15 seconds 10 cc. of N/10 hydrochloric acid are added. After 45 minutes of further stirring and mixing, the pH-value is again determined. Stirring is continued for nine minutes and the pH-value is noted. Immediately thereafter addition of 10 cc. of N/10 hydrochloric acid and measuring of the pH-value after 45 seconds and again after 9 minutes are repeated until the end point is reached, i. e., when the 45 seconds and the 9 minutes readings are found to be approximately the same and the pH does not decrease on addition of hydrochloric acid and does not increase after allowing the antacid preparation to act upon the acid solution for nine minutes. The end point is usually reached with a pH of 2.0 (±0.2).

Antacid therapy generally aims to maintain the pH of the stomach contents at values between pH 3.0 and pH 5.5. Antacid preparations the antacid capacity of which is within alkaline pH ranges, i. e., within ranges above pH 5.5, are undesirable because "acid rebound secretion" may occur.

An antacid preparation which passes too quickly through the pH-range 3.0 to 5.5 is also unsuitable because its buffering action is not sufficient and the presence of harmful free acid in the stomach contents occurs within a comparatively short period of time after addition of the antacid preparation. A satisfactory antacid preparation, therefore, shows a pattern of pH determinations whereby the pH-range between 3.0 and 5.5 is maintained for the longest possible period of time.

It was found that of the known antacid preparations the preparation obtained, for instance, according to Example 1 has by far the best antacid capacity. The antacid agent itself is much more slowly released than in other known antacid preparations and more of the antacid action takes place within the preferred pH-range between 3.0 and 5.5 than with any of the known antacid preparations. The danger of acid rebound secretion is substantially reduced because the alkaline range above pH 5.5 is quite rapidly passed through, and the antacid action is considerably prolonged because a pH below 3.0 is reached only after a long period of time, i. e., after about 90 to 110 minutes. Addition of guar gum to an antacid preparation, thus, produces the unexpected and unobvious beneficial result that the alkaline range above pH 5.5 is rather quickly traversed while the preferred pH-range between 3.0 and 5.5 is maintained for a surprisingly long time indicating that release of the antacid agent is considerably retarded.

We claim:

1. A pharmaceutical preparation for the treatment of hyperacidity in tablet form, said preparation comprising, intimately mixed with each other, an antacid agent, guar gum in an amount from about 10% to about 30% by weight of said antacid agent, and oatmeal in an amount from about 5% to about 15% by weight of said antacid agent.

2. A pharmaceutical preparation for the treatment of hyperacidity in tablet form, said preparation comprising, intimately mixed with each other, calcium carbonate, magnesium carbonate, magnesium trisilicate, and dried aluminum hydroxide gel, said compounds serving as antacid agents, guar gum in an amount of about 25% by weight of said antacid agents, and oatmeal in an amount of about 10% by weight of said antacid agents.

3. A pharmaceutical preparation for the treatment of hyperacidity in tablet form comprising, per tablet, about 105 mg. of calcium carbonate, about 60 mg. of magnesium carbonate, about 150 mg. of magnesium trisilicate, about 90 mg. of dried aluminum hydroxide gel, about 45 mg. of oatmeal, and about 100 mg. of guar gum.

4. A pharmaceutical preparation for treating hyperacidity, in tablet form, said preparation per tablet comprising calcium carbonate, magnesium trisilicate, guar gum, and oatmeal, the combined amount of calcium carbonate and magnesium trisilicate, by weight, exceeding the amount of guar gum and the amount of guar gum, by weight, exceeding the amount of oatmeal.

5. A pharmaceutical preparation for the treatment of hyperacidity comprising an intimate mixture of calcium carbonate, magnesium carbonate, magnesium trisilicate and aluminum hydroxide gel, said compounds serving as antacid agents, guar gum in an amount, by weight, less than the said antacid agents, and oatmeal in an amount from about 5% to 15%, by weight, of said antacid agents.

References Cited in the file of this patent

FOREIGN PATENTS 880,632    Germany _____ June 22, 1953

OTHER REFERENCES

Osborne: Bull. Nat. Formulary Comm., vol. 19, Jan.–Feb. 1951, pages 4 to 12.

Gross: Journal of the American Pharmaceutical Association, Sci. ed., March 1952, pages 157 to 161.

Howard: Modern Drug Encyclopedia, 5th ed. (1952), pages 30, 34, 504, 653.